United States Patent [19]

Shimada

[11] 4,359,973
[45] Nov. 23, 1982

[54] OILING SYSTEM FOR PISTON OF INTERNAL COMBUSTION ENGINE

[75] Inventor: Toshio Shimada, Tokorozawa, Japan

[73] Assignee: Honda Giken Kogyo Kabushiki Kaisha, Tokyo, Japan

[21] Appl. No.: 175,411

[22] Filed: Aug. 5, 1980

[30] Foreign Application Priority Data

Aug. 9, 1979 [JP] Japan .................. 54/103999[U]

[51] Int. Cl.³ ............................................. F01P 1/04
[52] U.S. Cl. .............................. 123/41.35; 123/41.39; 123/193 P; 92/160
[58] Field of Search ............ 123/193 R, 193 P, 41.35, 123/41.37, 41.38, 41.39; 92/160

[56] References Cited

U.S. PATENT DOCUMENTS

| | | | |
|---|---|---|---|
| 2,702,219 | 2/1955 | Sintz et al. | 92/160 |
| 3,494,262 | 2/1970 | Holcombe | 92/160 |
| 3,515,035 | 6/1970 | Cuddon-Fletcher | 92/160 |

FOREIGN PATENT DOCUMENTS

| | | | |
|---|---|---|---|
| 2743350 | 4/1979 | Fed. Rep. of Germany | 123/193 P |
| 55-19927 | 2/1980 | Japan | 123/41.37 |
| 5853 | of 1898 | United Kingdom | 123/193 P |

*Primary Examiner*—Craig R. Feinberg
*Attorney, Agent, or Firm*—Lyon & Lyon

[57] ABSTRACT

A piston is provided with a boss having a radial bore for reception of a piston pin. The upper portion of this bore receives lubricating oil through an oiling hole extending from a depression on the outer surface of the piston, the depression being open at the bottom and extending downward on opposite sides of the boss. Downward facing inclined walls form the upper limits of the depression and serve to cause flow of lubricating oil into the oiling holes.

2 Claims, 2 Drawing Figures

OILING SYSTEM FOR PISTON OF INTERNAL COMBUSTION ENGINE

This invention relates to systems for internal combustion engines and is particularly directed to improvements for lubricating the aligned bores in bosses formed on the piston, the bores receiving the piston pin that connects the piston to the connecting rod.

In the past, as a means for oiling the piston pin bores, oiling holes have been provided in the pin bosses along the direction of piston movement, so that lubricating oil under the piston is caused to enter the oiling holes during descending movement of the piston. However, when loading of the piston is very heavy during the power stroke, the conventional oiling means is unable to perform sufficient oiling function, and the lubrication between the piston pin bore and the piston pin may be insufficient in some cases.

Accordingly, the general object of this invention is to provide an improved oiling system for the piston pin of an internal combustion engine. More particularly, the invention relates to supplying lubricating oil to the upper interior portion of the bores which receive the piston pin.

Other objects and advantages will appear hereinafter.

Figure 2:
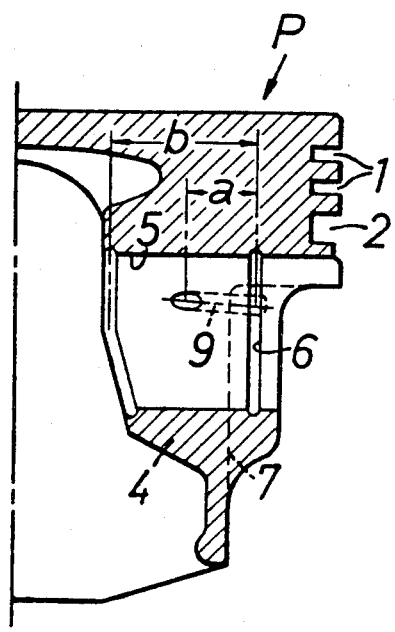
FIG. 2 is a sectional elevation, partly broken away, taken substantially on the lines 2—2 as shown on FIG. 1.

Referring to the drawings, the piston P is provided with two piston ring grooves 1 and one oil ring groove 2, all of conventional form. The oil ring groove 2 has a plurality of radial oil holes 3. Pin bosses 4 are located below the oil ring groove 2 and each is provided with a radial bore 5 to receive the piston pin, not shown. Near the outer end of each bore 5 a groove 6 is provided for reception of a retaining ring, not shown. The piston pin is positioned inwardly of the retaining ring such that the effective length of the bore requiring lubrication is the portion inwardly of the groove 6. A depression 7 is formed on the outer surface of the skirt of the piston P extending circumferentially on either side of each boss 4. Each depression 7 is in the form of a cavity opening downward. The upper walls 8 of each depression 7 are inclined upward toward the upper portion of the boss 4. Oiling holes 9 are provided in the upper part of the outer end of each boss 4, the oiling holes 9 preferably being inclined in the same direction as the upper walls of the depression 7 and inclined inward along the axial direction of each boss 4. The inner end of the oiling hole communicates with the upper part of the piston pin bore 5 in each boss 4. The angle of inclination α of the oiling hole 9 in reference to a horizontal plane is from 0° to 30°, and the angle of inclination β of the upper wall 8 in reference to the horizontal plane is 0° to 15°. Assuming that the length of the upper, effective portion of the bore 5 is labeled "b" and the distance between the inner end of the oiling hole 9 and the groove 6 in the bore 5 is labeled "a" both as shown in FIG. 2, then the ratio of these lengths may desirably be determined by the following formula:

$$b/a = 2$$

Figure 1:
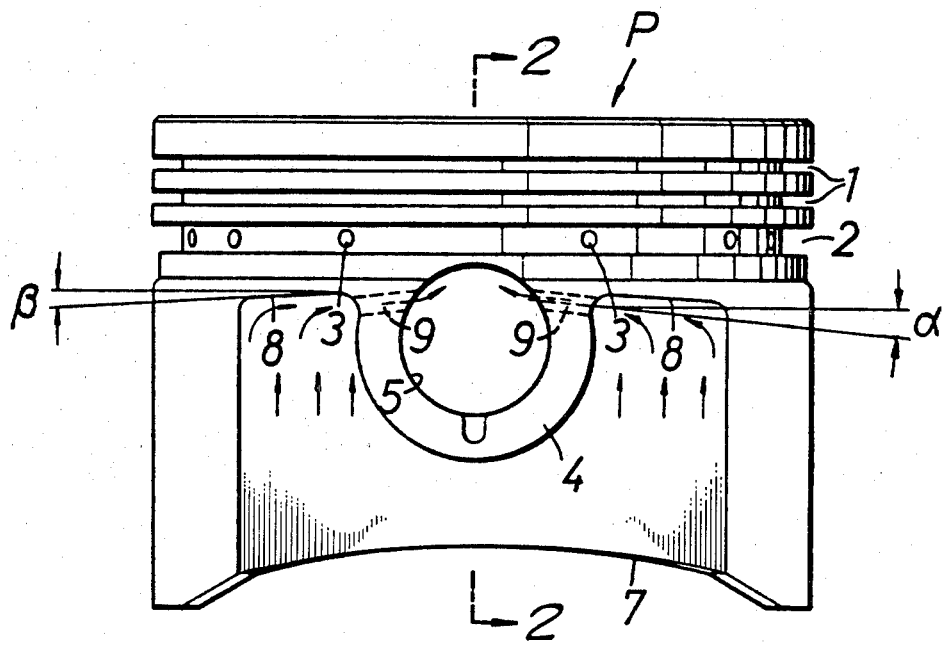
FIG. 1 is a side elevation showing a preferred embodiment of this invention.

In operation, when the piston P moves down in the cylinder bore, lubricating oil under the piston P enters the depression 7 as shown by arrows in FIG. 1. The lubricating oil in the depression 7 is checked and gathered by the upper walls 8 and is automatically introduced into the oiling holes 9 near the walls 8. The lubricating oil then flows through the oiling hole 9 into the piston pin bore 5 in the piston boss 4 for lubrication of the internal periphery of the bore 5.

When an excessive load is applied to the piston, as in the case where the piston is so large in diameter that the load applied to the piston during the power stroke is far greater than the load caused by inertia, the oiling system of the present invention makes it possible to provide good lubrication on the upper portion of the piston pin bore. The seizure resistance is remarkably improved. Furthermore, forced introduction of lubricating oil into the oiling hole 9 from oil flowing into the depression 7 also serves to reduce the amount of lubricating oil which reaches the combustion chamber.

Having fully described my invention, it is to be understood that I am not to be limited to the details herein set forth but that my invention is of the full scope of the appended claims.

I claim:

1. A piston for an internal combustion engine, having in combination: a boss having a radial bore for reception of a piston pin, a depression formed on an outer surface of the piston, the depression having an upper limit being formed by a downward facing wall, said depression extending downward on at least one side of said boss and having a bottom being open, and an oiling hole in said boss extending from the depression near said wall and communicating with said radial bore at a location above an axial centerline going through said bore, wherein said oiling hole has an angle of inclination in reference to a plane normal to an axis of the piston which is less than about 30° downwardly away from said radial bore, said wall having an angle of inclination in reference to a plane normal to the axis of the piston of less that about 15° downwardly away from said boss.

2. A piston for an internal combustion engine, having in combination: bosses having aligned radial bores for the reception of a piston pin, depressions symmetrically formed on an outer surface of the piston, each depression having a bottom being open and extending downward on opposite sides of one of said bosses, the depressions merging below that said boss, each of said depressions having an upper limit being formed by a downward facing inclined wall, said walls being on opposite sides of that said boss, respectively, and oiling holes in that said boss extending from said depressions, near said inclined walls and communicating with said radial bore of that said boss at locations above a plane formed by axial centerlines going through respective bores, wherein said oiling holes have angles of inclination in reference to a plane normal to an axis of the piston which are less than about 30° downwardly away from that said radial bore, said inclined walls having angles of inclination in reference to a plane normal to the axis of the piston of less than about 15° downwardly away from that said boss.

* * * * *